US010809529B2

(12) United States Patent
Robbins et al.

(10) Patent No.: US 10,809,529 B2
(45) Date of Patent: Oct. 20, 2020

(54) OPTICAL DEVICE HAVING MULTIPLEXED ELECTRODES

(71) Applicant: Microsoft Technology Licensing, LLC, Redmond, WA (US)

(72) Inventors: Steven John Robbins, Redmond, WA (US); Joel Steven Kollin, Seattle, WA (US); Andreas Georgiou, Cambridge (GB); Adrian Robert Leigh Travis, Paris (FR)

(73) Assignee: Microsoft Technology Licensing, LLC, Redmond, WA (US)

(*) Notice: Subject to any disclaimer, the term of this patent is extended or adjusted under 35 U.S.C. 154(b) by 110 days.

(21) Appl. No.: 15/623,906

(22) Filed: Jun. 15, 2017

(65) Prior Publication Data

US 2018/0364481 A1 Dec. 20, 2018

(51) Int. Cl.
*G02B 27/01* (2006.01)
*G02F 1/139* (2006.01)
(Continued)

(52) U.S. Cl.
CPC ....... *G02B 27/0172* (2013.01); *G02F 1/1393* (2013.01); *G02F 1/133528* (2013.01);
(Continued)

(58) Field of Classification Search
CPC ........... G02B 27/0172; G02F 1/133528; G02F 1/134309; G02F 1/1393
See application file for complete search history.

(56) References Cited

U.S. PATENT DOCUMENTS 5,182,665 A * 1/1993 O'Callaghan ........... G02F 1/292
349/117
5,535,029 A 7/1996 Clark
(Continued)

FOREIGN PATENT DOCUMENTS

CN 102621823 A 8/2012
EP 1186939 A2 3/2002
EP 2264839 A2 12/2010

OTHER PUBLICATIONS

Van Putten, E.G. et al., "Spatial amplitude and phase modulation using commercial twisted nematic LCDs", Journal of Applied Optics, vol. 47, Issue 12, Apr. 20, 2008, 13 pages.
(Continued)

*Primary Examiner* — Lucy P Chien
(74) *Attorney, Agent, or Firm* — Alleman Hall Creasman & Tuttle LLP

(57) ABSTRACT

An optical device comprises a pixel array including one or more pixels. Two or more independently controllable electrodes are electrically coupled to each pixel. A common ground reference electrode is electrically coupled to all pixels of the pixel array. Each pixel includes a plurality of liquid crystal molecules. The liquid crystal molecules may be oriented in a first direction based on a first function of voltages applied by the two or more independently controllable electrodes for the pixel, and oriented in a second direction based on a second function of the voltages applied by the two or more independently controllable electrodes for the pixel. In this way, both phase modulation and polarization modulation may be introduced to light illuminating the pixel array.

20 Claims, 7 Drawing Sheets

(51) Int. Cl.
 G02F 1/1335 (2006.01)
 G02F 1/1343 (2006.01)
 G03H 1/02 (2006.01)
 G03H 1/22 (2006.01)
(52) U.S. Cl.
 CPC ......... *G02F 1/134309* (2013.01); *G03H 1/02* (2013.01); *G03H 1/2294* (2013.01); *G02F 2001/134345* (2013.01); *G02F 2001/134381* (2013.01); *G02F 2201/121* (2013.01); *G02F 2201/124* (2013.01); *G02F 2203/01* (2013.01); *G02F 2203/02* (2013.01); *G02F 2203/12* (2013.01); *G03H 2001/0224* (2013.01); *G03H 2225/33* (2013.01); *G03H 2225/34* (2013.01); *G03H 2225/36* (2013.01); *G03H 2225/52* (2013.01)

(56) References Cited

U.S. PATENT DOCUMENTS

| | | | |
|---|---|---|---|
| 5,543,251 | A | 8/1996 | Taylor |
| 5,661,577 | A | 8/1997 | Jenkins et al. |
| 5,844,700 | A | 12/1998 | Jeganathan et al. |
| 6,266,167 | B1 | 7/2001 | Klug et al. |
| 6,293,898 | B1 | 9/2001 | Yang |
| 6,373,806 | B1 | 4/2002 | Kitamura et al. |
| 6,710,901 | B2 | 3/2004 | Pastor |
| 6,897,433 | B2 | 5/2005 | Itoh et al. |
| 6,999,397 | B2 | 2/2006 | Roh et al. |
| 7,200,092 | B2 | 4/2007 | Meyrueis et al. |
| 7,502,157 | B1 | 3/2009 | Dueweke |
| 7,733,557 | B2 | 6/2010 | Handschy et al. |
| 8,605,561 | B2 | 12/2013 | Gladney et al. |
| 8,808,944 | B2 | 8/2014 | Lawrence et al. |
| 9,474,143 | B2 | 10/2016 | Zhan et al. |
| 9,734,858 | B2 | 8/2017 | Barada et al. |
| 2002/0158826 | A1* | 10/2002 | Hirota ............... G02F 1/134363 345/87 |
| 2004/0263968 | A1 | 12/2004 | Kobayashi et al. |
| 2005/0180291 | A1 | 8/2005 | Ogasawara |
| 2005/0276205 | A1 | 12/2005 | Heor et al. |
| 2006/0280094 | A1 | 12/2006 | Tsukagoshi et al. |
| 2007/0013835 | A1* | 1/2007 | Matsushima ..... G02F 1/133555 349/113 |
| 2007/0139586 | A1 | 6/2007 | Gu et al. |
| 2008/0254372 | A1 | 10/2008 | Wu |
| 2009/0207710 | A1 | 8/2009 | Ayres et al. |
| 2010/0046050 | A1 | 2/2010 | Kroll et al. |
| 2010/0118219 | A1 | 5/2010 | Leister |
| 2010/0125356 | A1 | 5/2010 | Shkolnik et al. |
| 2010/0195178 | A1 | 8/2010 | Leister et al. |
| 2011/0094585 | A1 | 4/2011 | Debije et al. |
| 2011/0096250 | A1 | 4/2011 | Cha et al. |
| 2012/0013594 | A1* | 1/2012 | Ishihara ............ G02F 1/134363 345/211 |
| 2012/0300608 | A1 | 11/2012 | Masumura |
| 2013/0021545 | A1 | 1/2013 | Song et al. |
| 2014/0009808 | A1 | 1/2014 | Wang et al. |
| 2014/0078878 | A1 | 3/2014 | Tsuyama et al. |
| 2014/0111715 | A1* | 4/2014 | Jeong ..................... G02B 27/26 349/15 |
| 2014/0204437 | A1 | 7/2014 | Ayres et al. |
| 2015/0277551 | A1 | 10/2015 | Travis |

OTHER PUBLICATIONS

Lin, Y. et al., "Polarisation-independence liquid crystal devices", Liquid Crystals Today, vol. 17, Issues 1-2, Jul. 2008, 8 pages.
Lin, Y. et al., "A Polarizer-Free Electro-Optical Switch Using Dye-Doped Liquid Crystal Gels", In Journal of Materials, vol. 2, Oct. 26, 2009, 12 pages.
Zhu, L. et al., "Arbitrary manipulation of spatial amplitude and phase using phase-only spatial light modulators", In Journal of Scientific Reports, vol. 4, Dec. 11, 2014, 7 pages.
Yang, D., "Review of operating principle and performance of polarizer-free reflective liquid-crystal displays", Journal of the Society for Information Display, vol. 16, Iss. 1, Jan. 2008, 3 pages.
Reichelt, S. et al., "Computational hologram synthesis and representation on spatial light modulators for real-time 3D holographic imaging", In Proceedings of the 9th International Symposium on Display Holography (ISDN 2012), Jun. 25, 2012, Cambridge, Massachusetts, USA, 10 pages.
Nolte, S. et al., "Femtosecond waveguide writing: a new avenue to three-dimensional integrated optics," Applied Physics A, Materials Science & Processing, vol. 77, Issue 1, Jun. 2003, 3 pages.
Kumar, A. et al., "Making an optical vortex and its copies using a single spatial light modulator," Physics Letters A, vol. 375, Issue 41, Sep. 26, 2011, 7 pages.
Granger, C., "Polarization Control of Light with a Liquid Crystal Display Spatial Light Modulator," Thesis Presented to the Faculty of San Diego State University, 2013, 80 pages.
Zhang, J. et al., "5D Data Storage by Ultrafast Laser Nanostructuring in Glass," In Proceedings of the CLEO: Science & Innovations Conference, San Jose, CA, USA, Jun. 9, 2013, 2 pages.
Zhang, Z. et al., "Fundamentals of phase-only liquid crystal on silicon (LCOS) devices," In Journal of Light: Science and Applications, vol. 3, Oct. 24, 2014, 10 pages.
Kazansky, P. et al., "Eternal 5D data storage via ultrafast-laser writing in glass," In Proceedings of International Society for Optics and Phototonics, vol. 9736, Mar. 4, 2016, 3 pages.
Wang, J. et al., "The Polarization Multiplexing Image with a Single Diffractive Optical Element," In Journal of IEEE Phototonics, vol. 9, No. 3, Jun. 2017, 9 pages.
Georgiou, A. et al., "Multi-Beam Optical System for Fast Writing of Data on Glass," Application as Filed in U.S. Appl. No. 15/699,597, filed Sep. 8, 2017, 40 pages.
Wang, T. et al., "Generation of perfect polarization vortices using combined grating in a single spatial light modulator," In Journal of Applied Optics, vol. 56, Issue 27, Sep. 20, 2017, 1 page.
Georgiou, A. et al., "Data Storage Using Light of Spatially Modulated Phase and Polarization," Application as Filed in U.S. Appl. No. 15/894,778, filed Feb. 12, 2018, 35 pages.
Nordin, et al., "Liquid Crystal-On-Silicon Implementation of the Partial Pixel Three-Dimensional Display Architecture", Applied Optics, Optical Society of America, Washington, DC; US, vol. 34, No. 19, Jul. 1, 1995, 8 Pages.
"International Search Report and Written Opinion Issued in PCT Application No. PCT/US2018/034253", dated Aug. 27, 2018, 12 Pages.
"Spatial Light Modulators", http://holoeye.com/spatial-light-modulators/, Published on: Dec. 11, 2016, 3 pages.
Dunayevsky, et al., "MEMS Spatial Light Modulator for Phase and Amplitude Modulation of Spectrally Dispersed Light", In Journal of Microelectromechanical Systems, vol. 22, Issue 5, Oct. 2013, pp. 1213-1221.
Weng, et al., "High-efficiency and fast-switching field-induced tunable phase grating using polymer-stabilized in-plane switching liquid crystals with vertical alignment", In Journal of Physics D: Applied Physics, Feb. 23, 2016, 7 pages.
"Phase spatial light modulator LCOS-SLM", In Publication of Hamamatsu, Apr. 24, 2017, pp. 1-14.
Eng, et al., "Optimization of Liquid-Crystal Spatial Light Modulator for Precise Phase Generation", In Proceedings of Proceedings of Conference on Optoelectronic and Microelectronic Materials and Devices, Dec. 6, 2006, 6 pages.
Meneses-Fabian, et al., "Polarized light by quadrature amplitude modulation", In Journal of Optics and Lasers in Engineering, vol. 51, Issue 4, Apr. 2013, 2 pages.

\* cited by examiner

OPTICAL DEVICE HAVING MULTIPLEXED ELECTRODES

BACKGROUND

Holographic display devices create virtual three-dimensional images. Some holographic display devices may utilize a phase modulating display panel to create a holographic image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An optical device comprises a pixel array including one or more pixels. Two or more independently controllable electrodes are electrically coupled to each pixel. A common ground reference electrode is electrically coupled to all pixels of the pixel array. Each pixel includes a plurality of liquid crystal molecules. The liquid crystal molecules may be oriented in a first direction based on a first function of voltages applied by the two or more independently controllable electrodes for the pixel, and oriented in a second direction based on a second function of the voltages applied by the two or more independently controllable electrodes for the pixel. In this way, both phase modulation and polarization modulation may be introduced to light illuminating the pixel array.

DETAILED DESCRIPTION

Figure 1:
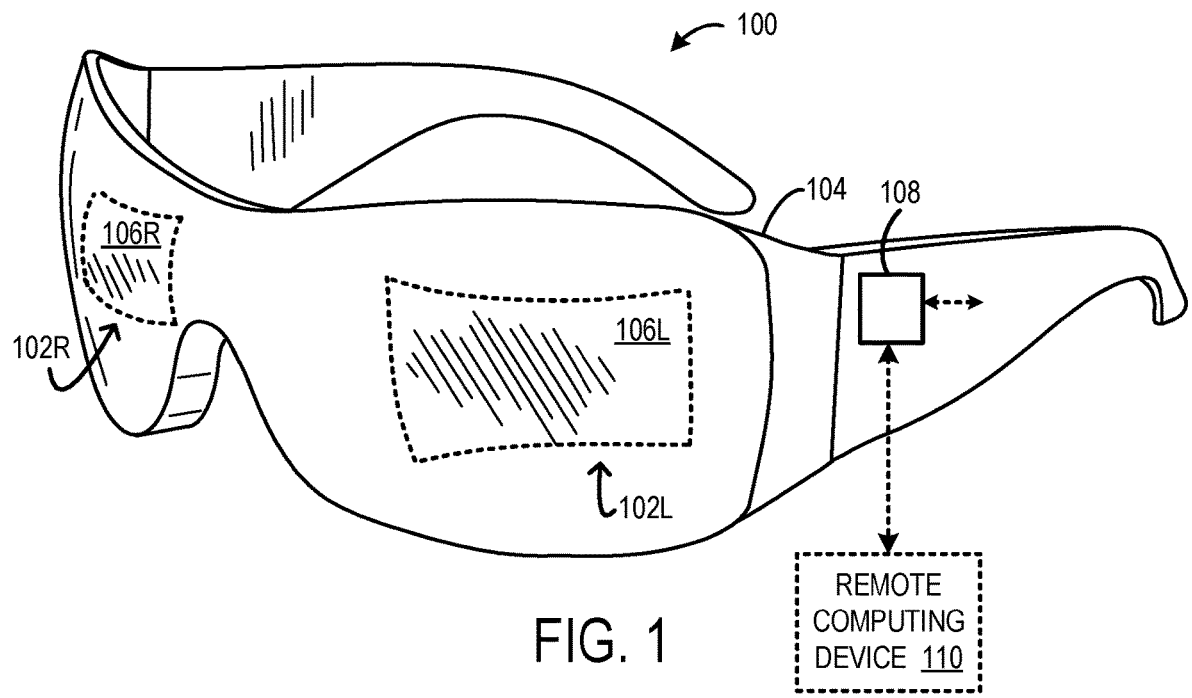
FIG. 1 shows an example near-eye display device.

Holographic displays can form arbitrary 2D and 3D distributions of light, thus emulating real life visual experiences. Holograms can display 3D objects, and can project one or more 2D images in multiple depth planes in space, thus enabling virtual reality (VR) and augmented reality (AR) applications. Holograms are usually compact, flat, and thin devices where an arbitrary wavefront can be encoded. This makes holographic projection systems well-suited for Head Mounted Displays (HMDs), Near Eye Displays (NEDs) smartphones, tablets and any other device where weight or thickness is a design factor.

A dynamic hologram includes a controllable interference pattern through which a light waveform is diffracted to produce an image holographically. In particular, the light waveform undergoes a transformation when emitted from the dynamic hologram according to an intensity and phase of the interference pattern. In one example, such a transformation is characterized by at least one Fourier transform that defines both a hologram plane and an image plane as complex functions with phase and amplitude components. For example, a hologram can be represented mathematically as the product of two functions, one being a real positive function that defines the amplitude modulation, such as $A(x,y)$, and another function that contains only the phase information and has an amplitude of unity, such as $\exp(i*\varphi(x,y))$.

A liquid crystal (LC) device may serve as a dynamic hologram, because optical characteristics of the liquid crystal structure(s) can be manipulated to modulate either phase or amplitude of an incident light wavefront to achieve a desired Fourier transform. However, in such an LC device the phase and amplitude parameters may be interlinked; i.e. for a given phase, the amplitude is fixed or vice versa. Given this limitation, a holographic LC device typically is configured to modulate only the phase of a light wavefront while the amplitude as a function of the phase remains constant (e.g., as close to unity as possible).

For example, the phase distribution for the Fourier transform(s) for an LC device to generate a phase-only hologram (i.e., a hologram where only phase can be modulated and amplitude is fixed) may be computed using a Hologram Design Algorithm (HDA), such as the Gerchberg-Saxton (GS) algorithm. The HDA may perform numerous iterations to determine the phase information while the amplitude approaches unity. However, even after performing numerous iterations and undergoing significant computational load, the amplitude does not converge completely to unity using such an approach. The inability of the hologram amplitude to converge to unity has at least two disadvantages. First, any residual amplitude modulation will introduce additional noise in the image resulting from the hologram. Second, computationally intensive algorithms are required to reduce the amplitude modulation in order to improve the image quality of the resulting image.

Various solutions to these problems have been proposed. However, such approaches tend to introduce additional problems, such as degraded image quality. In one approach, known as two-pixel encoding, two or more pixels are grouped together and treated as a single pixel. The phasors formed by the two pixels add together to form a "single pixel" with amplitude and phase that can be determined based on their vectorial sum. By increasing the angle between the two pixel phasors, the amplitude modulation decreases, while the phase is determined by the mean phase value of the two phasors. However, the two pixels do not truly act as one, as they have different spatial locations. At different positions on the image plane the waves from the two pixels will travel different distances and a variable phase delay is introduced between them. This results in an image that gradually degrades away from the center and at least half of the image in each dimension becomes noise. A similar method allocates areas on the image plane as "do not care" areas. The image quality of the "do not care" areas is sacrificed to reduce computation and to improve image quality elsewhere.

An alternative approach that achieves both phase and amplitude modulation uses the two-pixel approach above with additional optical components. The additional optical components shift odd rows by a single pixel so that two adjacent pixels are effectively in the same position. Phase and amplitude modulation may thus occur on the same position on the hologram and truly phase-amplitude modulation can be achieved.

Although this technique works well for large holograms, it is challenging to implement for holograms with very small pixels. Fabrication of the necessary optical components is difficult and accurately aligning them is challenging. Additionally, for very small pixel sizes, the width of the pixel may be order of magnitudes smaller than the thickness of optical components, making the spatial shifting of narrow light beams challenging due to the introduction of diffractive effects and manufacturing constrains.

In this disclosure, examples are disclosed that relate to simultaneously achieving phase and polarization and/or amplitude modulation in a display device via the use of two or more electrodes for a single pixel. By using multiple electrodes, independent control of the electric field between the pixel electrodes and the field between the pixel electrodes and the top electrode may be exerted.

This imparts the flexibility to rotate the LC molecules in two directions. One direction may be controlled by the fringing fields between pixels and a second may be controlled by the net effective electric field between all pixel electrodes and the top electrode. Phase and polarization modulation may thus be introduced through controlling the applied voltages from the electrodes. Polarization modulation may then be converted to amplitude modulation via a polarizer.

FIG. 1 shows an example holographic display in the form of a near-eye display device 100. The display device 100 includes right-eye and left-eye holographic display systems 102R and 102L mounted to a frame 104 configured to rest on a wearer's head. Each of the right-eye and left-eye holographic display systems 102 include image display componentry configured to project computerized virtual imagery into left and right display windows 106R and 106L in the wearer's field of view (FOV). In one example, the light-deflecting image display componentry includes one or more holographic optical components. Different example holographic display systems representative of the right-eye and left-eye holographic display systems 102R and 102L are described in more detail below with reference to FIGS. 2-6.

In some implementations, the right and left display windows 106R and 106L are wholly or partially transparent from the perspective of the wearer, to give the wearer a view of a surrounding environment. In other implementations, the right and left display windows 106R, 106L are opaque, such that the wearer is completely absorbed in virtual-reality (VR) imagery provided via the near-eye display device. In yet other implementations, the opacities of the right and/or left display windows 106R, 106L may be dynamically controlled via a dimming filter. A substantially see-through display window, accordingly, may be switched to full opacity for a fully immersive virtual-reality experience.

Display device 100 includes an on-board computing system 108 configured to render the computerized display imagery, which is provided to right and left display windows 106 via right-eye and left-eye holographic display systems 102. Computing system 108 is configured to send appropriate control signals to right display window 106R, thus causing the right display window to form a right display image. Likewise, the computing system 108 is configured to send appropriate control signals to left display window 106L, thus causing the left display window to form a left display image. The computing system 108 may include a logic subsystem and a storage subsystem, as discussed in more detail below with respect to FIG. 8. Operation of the display device 100 additionally or alternatively may be controlled by one or more remote computing device(s) 110 (e.g., in communication with display device 100 via a local area network and/or wide area network).

Figure 2:
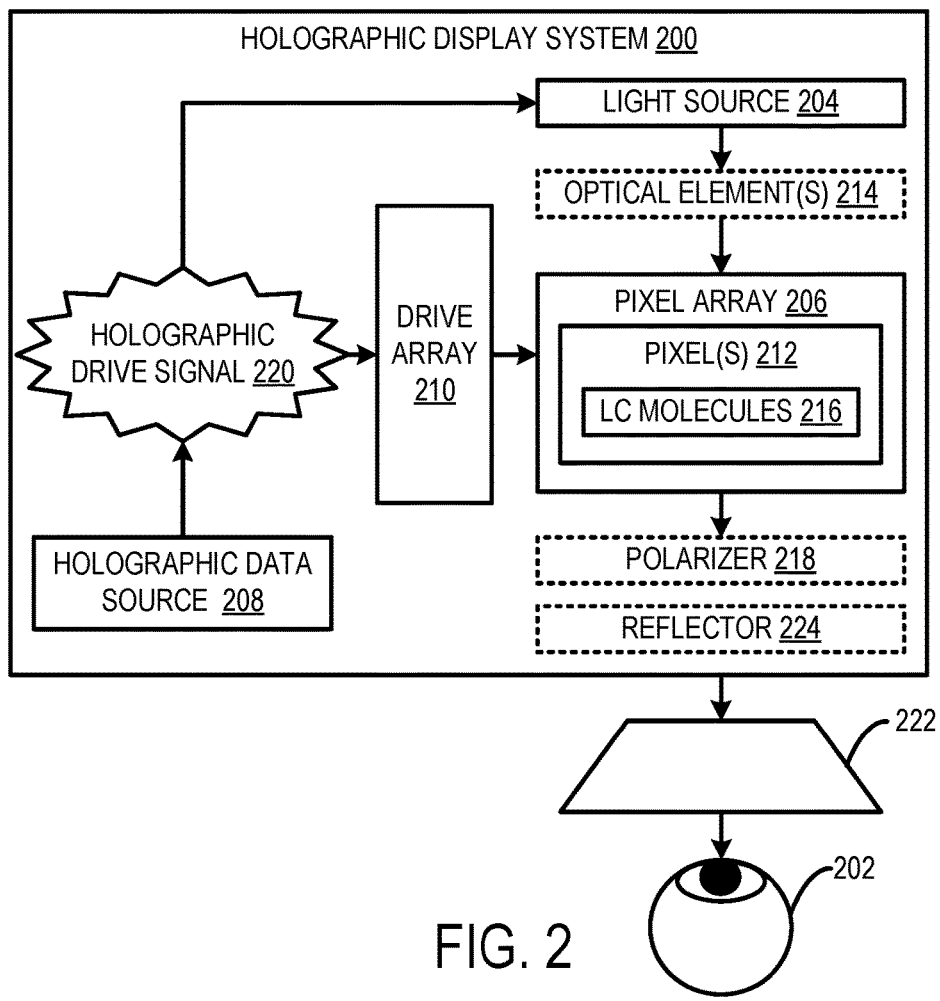
FIG. 2 shows an example holographic display system that may be implemented in a near-eye display device.

FIG. 2 schematically shows an example holographic display system 200 in simplified form. For example, the holographic display system 200 may be incorporated into a display device, such as near-eye display device 100 of FIG. 1. In particular, the holographic display system 200 may be representative of the right-eye or left-eye holographic display systems 102R and 102L of the display device 100 of FIG. 1. In another example, the holographic display system 200 may be incorporated into a computing system 800 of FIG. 8. Generally, the holographic display system 200 may be incorporated into any suitable display device configured to direct coherent illumination light through a dynamic hologram to form an image. The holographic display system 200 includes a light source 204, a pixel array 206, a holographic data source 208, and a drive array 210.

The light source 204 may be configured to output coherent light to illuminate one or more pixels 212 of the pixel array 206. In particular, the light source 204 may be configured to emit coherent light wavefronts based on holographic drive signals received from the holographic data source 208. The coherent light emitted by the light source 204 may be directed to one or more pixels 212 of the pixel array 206 in any suitable manner. In one example, a coherent light wavefront is planar and normal to a direction of propagation with little or no beam divergence such that the coherent light wavefront uniformly illuminates the pixel array 206. In one example, the light source 204 comprises a laser configured to emit coherent light having uniform polarization and monochromaticity. In another example, light emitting diodes are used. The light source 204 may take any suitable form of light source that is configured to emit coherent light to illuminate the pixel array 206. In some implementations, one or more optical elements 214 and/or optical filters may be used to polarize/modulate/condition/direct the light on the way to the pixel array 206.

The pixel array 206 is an example of a dynamic hologram (e.g., a spatial light modulator) that forms a layer in an optical assembly of the holographic display system 200. The pixel array 206 includes one or more pixels 212 that may be manipulated to form a hologram. Depending on the implementation, the hologram may be transmissive or reflective. In some implementations, the pixels 212 may be arranged to form a two-dimensional (2D) hologram. In one example, the pixel array 206 includes a 2D array of 1024×1024 pixels. In some implementations, the pixels 212 may be arranged in an irregular array. The pixel array 206 may include any suitable number of pixels 212 arranged to form any suitable type of hologram.

Each pixel 212 includes a plurality of liquid crystal (LC) molecules 216. LC molecules 216 may be configured to selectively modulate the phase and polarization of a light wavefront that passes through a pixel 212. LC molecules 216 may be configured to modulate the phase of a light wavefront to any suitable phase within a phase range. In one example, LC molecules 216 are configured to selectively modulate the phase of a light wavefront to any phase within a phase range of 0 to 2π. LC molecules 216 may be configured to modulate the polarization of a light wavefront to any suitable polarization within a polarization range. Such polarization modulation may be converted to amplitude modulation by passing the light wavefront through one or more polarizers 218. In one example, LC molecules 216 are configured to selectively modulate the polarization of a light wavefront to achieve any amplitude within an amplitude range of 0% to 100%. In some examples, LC molecules 216 are configured to modulate the polarization of a light wavefront to achieve less than a full amplitude range (e.g., 50%-100%).

Even with a limited range of amplitude modulation, a suitable hologram may be formed by the pixel array 206. Unlike a conventional display where between 0% and 100% transmittance is required, in a hologram, good image quality may be achieved with 65% to 100% modulation. Using appropriate hologram design algorithms, the range of amplitude modulation can be reduced to produce a hologram with very little noise. Moreover, the limited range of amplitude modulation may allow for reduced computational demand.

The holographic data source 208 is configured to supply a holographic drive signal 220 to the light source 204 and the drive array 210. The aspect of the holographic drive signal 220 supplied to drive array 210 defines a hologram to be formed by the pixel array 206 for a given image frame. The aspect of the holographic drive signal 220 supplied to light source 204 indicates when to emit a light pulse to illuminate the pixel array 206 with a light wavefront.

The holographic drive signal 220 includes, for each pixel, during each of a plurality of time-varying holographic image frames, a phase component defining phase modulation for the pixel and a polarization component defining polarization modulation for the pixel. In one example, the phase component of the holographic drive signal 220 may be represented as an argument of a complex function having values that are complex numbers including real and imaginary parts. The polarization component may be represented as the modulus of that same complex function. For example, the complex functions may be computed by the holographic data source 208 as Fourier transforms to determine the phase component and the polarization component. In one example, the holographic data source 208 may be configured to compute and output a holographic drive signal 220 for each image frame of the plurality of time-varying image frames, thus producing a video of holographic images.

The holographic drive signal 220 may take any suitable form. In some implementations, the holographic drive signal 220 may include a step signal. In some implementations, the holographic drive signal 220 may include a pulse width modulated (PWM) signal. In some implementations, the holographic drive signal 220 has one frequency. In other implementations, the holographic drive signal 220 has two or more different frequencies.

The drive array 210 includes a plurality of electrodes configured to translate the drive signal into corresponding pixel activations in the pixel array 206. Each pixel 212 may include any suitable number of corresponding electrodes of the drive array 210. In one example, each pixel is electrically coupled to a ground electrode and two or more drive electrodes. The electrodes of the drive array 210 may include any suitable material. In one example, the electrodes are made of indium tin oxide (ITO). The electrodes of the drive array 210 are driven to modulate the orientation of the LC molecules 216 of each pixel based on the holographic drive signal 220.

When the pixel array 206 is illuminated with a light wavefront emitted from the light source 204, the phase and polarization of the light wavefront is modulated by the LC molecules 216 of the different pixels 212 of the pixel array 206. Such phase and polarization modulation of the light wavefront results in reconstruction/projection of a holographic image 222 that is output from the holographic display system 200 to the user's eye 202. The holographic image 222 output from the holographic display system 200 may take any suitable form. In one example, the holographic image 222 is a 2D image that is projected onto an optical display element (e.g., a lens).

The holographic display system 200 is provided as an example of an optical projection device, and is meant to be non-limiting. For example, components of holographic display system 200 such as light source 204, pixel array 206, drive array 210, optical elements 214, polarizer 218, and reflector 224 or their equivalents may be incorporated into various other display devices for the purposes of introducing phase, polarization, and/or amplitude modulation to a light wavefront. Such optical projection devices may include, but are not limited to, pattern generating devices for a depth sensor (e.g., time-of-flight camera), optical tweezers, machining devices, and write heads (e.g., for data storage devices).

Although the holographic display system 200 is discussed in the context of a near-eye display device, concepts disclosed herein are broadly applicable to any suitable type of holographic display. For example, such holographic displays may be configured to project a holographic image onto a screen, into an eye, into a waveguide, or may be a part of a larger optical system. In some examples, holographic display system may be configured as a reflective display (as opposed to a transmissive display). In such examples, a reflector 224 (e.g. a reflective backplane) may be positioned to reflect light back through pixel array 206 prior to forming holographic image 222. Reflector 224 may be a dielectric mirror, as an example.

Pure phase modulation is achieved when the light wavefront travels slower. This can be achieved, for example, when the LC molecules rotate such that the E-field of the light wavefront is always perpendicular to the axis of the molecules (also referred to as nematic director). Light waves that are parallel to or perpendicular to the orientation of LC molecule orientation do not undergo polarization modulation. Polarization and amplitude modulation is achieved when the nematic director is at an angle (i.e. not 0 or 90 degrees) with the electric field vector. This causes the polarization of the electric field vector to change, thus introducing polarization modulation. Polarization modulation may then be converted to amplitude modulation by using a polarizer to remove one of the directions of polarization. Typically, the nematic director vector is perpendicular to the electric field vector of the light wavefront, and thus there is no polarization modulation. Drive arrays force the molecules to rotate within one plane, e.g., the plane of polarization. To achieve both phase and polarization modulation (and/or amplitude modulation), the LC molecules must be rotated in two separate planes.

Figure 3A:
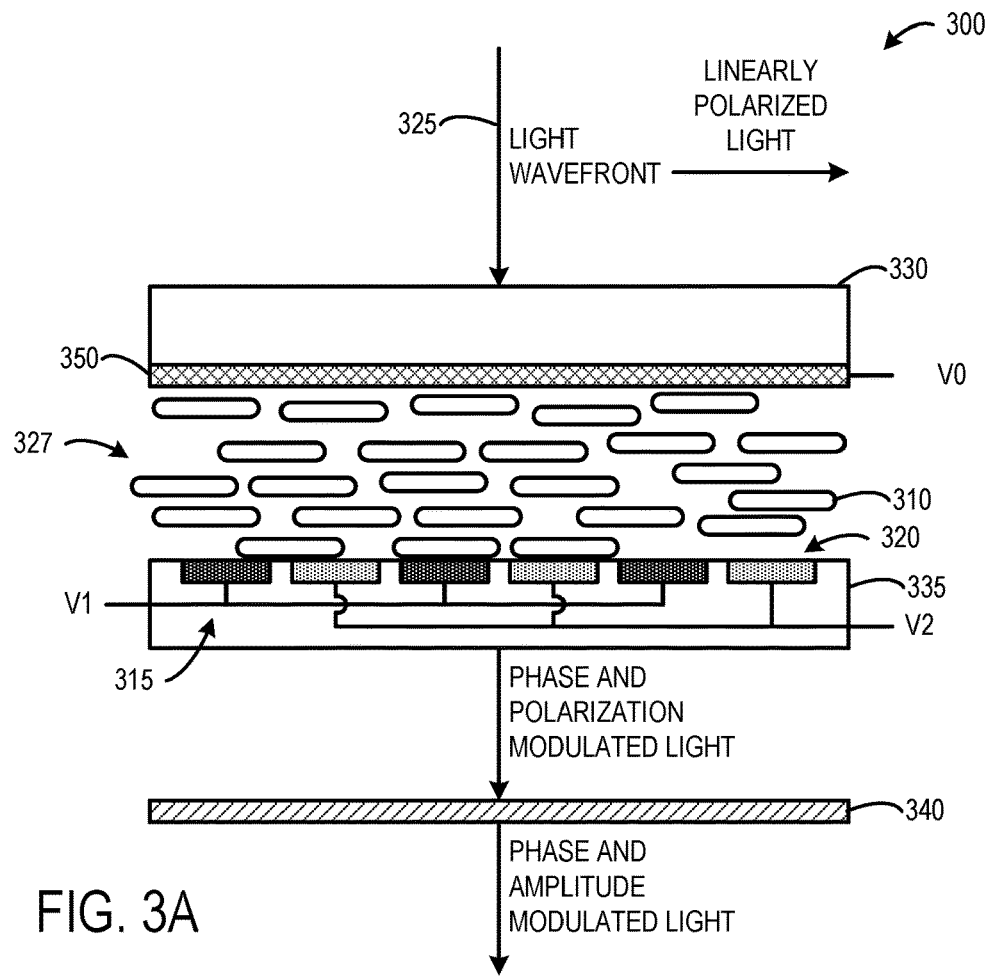
FIG. 3A shows a pixel of an example transmissive dynamic hologram display including liquid crystal molecules and multiple independently controllable electrodes.
Figure 3B:
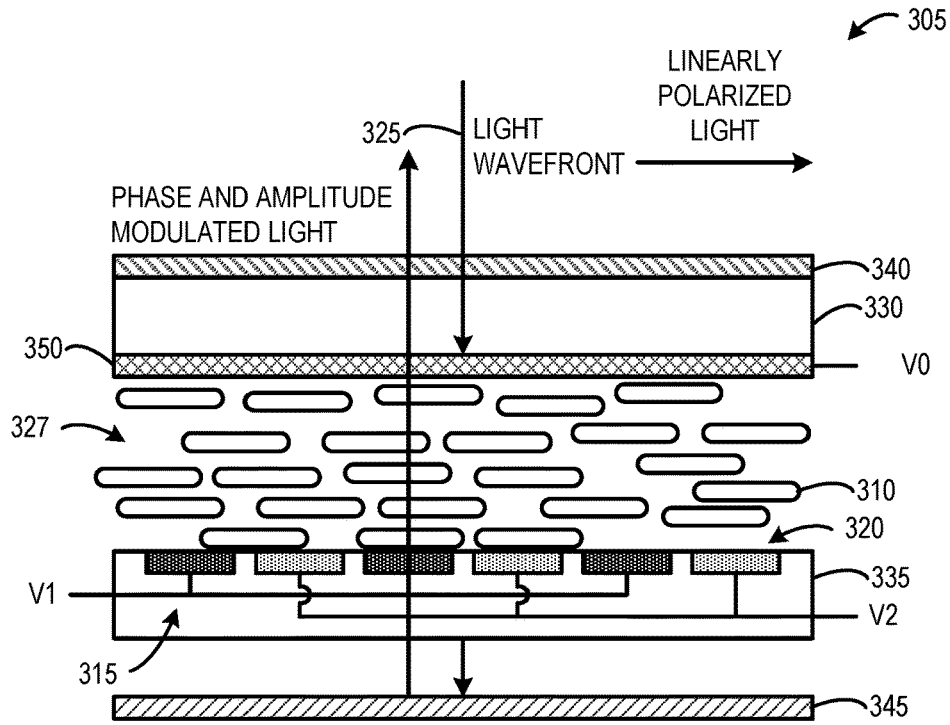
FIG. 3B shows a pixel of an example reflective dynamic hologram display including liquid crystal molecules and multiple independently controllable electrodes.

FIGS. 3A and 3B shows example pixels 300 and 305, respectively. Pixel 300 is configured as a transmissive pixel, while pixel 305 is configured as a reflective pixel. While pixels 300 and 305 are discrete examples, common part numbers are used in these figures and in the description below for parts common to both examples. Each pixel includes a plurality of LC molecules 310. Although depicted as rod-shaped molecules, it should be understood that LC molecules 310 having other shapes and/or configurations may be used. Each pixel includes at least a first drive electrode set 315 and a second drive electrode set 320. First drive electrode set 315 and a second drive electrode set 320 may be configured to independently apply voltages that cause rotation of LC molecules 310 about two different axes to modulate both phase and polarization of a light wavefront 325.

The LC molecules 310 are configured to rotate about two different axes based on the pixels 300 and 305 being driven with different voltages. Rotation of LC molecules 310 about the first axis produces phase modulation. Rotation of LC molecules 310 about the second axis produces polarization modulation. In this implementation, since LC molecules 310 are configured to modulate polarization, the incoming light wavefront 325 has a polarization (e.g., linearly polarized) that is designated for this particular configuration.

The LC molecules 310 are located within an LC layer 327 between a light input side 330 and an opposite side 335 (relative to light input). Pixel 300 further includes a polarizer layer 340 positioned downstream from opposite side 335. Polarizer layer 340 is configured to translate the polarization modulation of the light wavefront 325 that is output from opposite side 335 into amplitude modulation. Accordingly, light wavefront 325 that is output from the polarizer layer 340 can be modulated in both phase and amplitude. As illustrated, pixel 300 is configured as a transmissive pixel, and polarizer layer 340 may be considered to be located at a light output side of pixel 300. Pixel 305 includes a reflector 345 and is thus configured as a reflective pixel. Polarizer layer 340 may be positioned on light input side 330, in order to convert polarization modulated light to amplitude modulated light upon reflection. Light wavefront 325 that is output from the LC layer 327, and thus contains phase and polarization modulated light, is reflected off reflector 345, traversing opposite side 335, LC layer 327, light input side 330, and polarizer layer 340 to be emitted from pixel 305.

Light input side 330 further includes a ground electrode 350. Ground electrode 350 may be coupled to some or all other pixels which share a pixel array with pixels 305 or 310. First drive electrode set 315 and a second drive electrode set 320 are included at opposite side 335. In this example, each of first drive electrode set 315 and a second drive electrode set 320 are shown with three electrode portions that are commonly driven. However, other configurations are possible, including those depicted in FIGS. 4-6. First drive electrode set 315 is configured to apply a first voltage (V1) to pixels 300/305. Second drive electrode set 320 is configured to apply a second voltage (V2) to pixels 300/305.

Voltage differences between V1 and V2 may generate fringing fields. Usually, fringing fields are considered a negative aspect of LC devices as such fields place a limit on display resolution. As pixels/electrodes are reduced in size, their effect on LC molecules 310 at the light input side 330 of the pixel diminishes, while the strength of the electric field vector between the electrodes increases. Herein, the fringing fields are used to introduce polarization modulation near the electrodes while the light input side 330 of the pixel is used to introduce phase modulation to the light wavefront 325. In other examples, this configuration may be reversed or both the light input and opposite sides of the device may contribute to both phase and polarization/amplitude modulation.

When first drive electrode set 315 and a second drive electrode set 320 are applying voltages, fringing fields are formed near the electrodes, and are the main factor in controlling the orientation of local LC molecules 310 in this region. LC molecules 310 will respond primarily proportionate to a first function of the voltages of first drive electrode set 315 (V1) and second drive electrode set 320 (V2) (e.g. F1(V1, V2)). The first function may be based at least in part on a difference between the voltages of first and second drive electrode sets. In some examples, LC molecules 310 will rotate on an axis perpendicular to the device, thus introducing polarization modulation, which may then be converted to amplitude modulation via polarizer layer 340. This effect is similar to in-plane switching which is normally only applied to large-scale displays.

Towards light input side 330, the fringing fields are weakened. The orientation of LC molecules 310 at a location within the pixel is predominantly controlled by a second function of the voltages of first drive electrode set 315 (V1) and second drive electrode set 320 (V2) (e.g. F2(V1, V2)). The second function may be based at least in part on a net effective voltage of the first and second drive electrode sets relative to common ground reference electrode 350 at that location in the pixel. LC molecules 310 responding proportionately to the second function of V1 and V2 will rotate such as to introduce phase modulation to light wavefront 325.

As such, at least some of LC molecules 310 within pixels 300/305 that are proximate to opposite side 335 may be reoriented in a first direction based on a first function of the voltages of first drive electrode set 315 (V1) and second drive electrode set 320 (V2) (e.g. F1(V1, V2)) by rotating about a first axis (e.g., perpendicular to the plane of the pixels 300/305). Such rotation modulates the polarization of the light wavefront 325, which is translated to amplitude modulation by the polarizer layer 340.

Further, at least some of LC molecules 310 within pixels 300/305 that are proximate to light input side 330 may be reoriented in a second direction based on a second function of the voltages of first drive electrode set 315 (V1) and second drive electrode set 320 (V2) (e.g. F2(V1, V2)) by rotating about a second axis (e.g., parallel to a plane of the pixels 300/305). Such rotation modulates the phase of the light wavefront 325. The orientation of LC molecules 310 in the second direction may further be based on a voltage of the common ground reference electrode 350.

First drive electrode set 315 (V1) and second drive electrode set 320 (V2) may be independently controllable to two or more voltage states. In various examples, each electrode set may be driven by an analog drive, by a bit-plane method akin to pulse-wave modulation, or in any other suitable manner. Values for V1 and V2 may be calculated based on a given holographic drive signal (e.g., determined via a lookup table). In some examples, voltages from neighboring electrodes/pixels may bleed into a pixel. As such, the values for V1 and/or V2 also may be based at least partly on the voltage values for neighboring electrodes/pixels.

In order to leverage fringing fields to introduce modulation of the nematic director in multiple directions, two or more electrodes are needed per pixel. These electrodes may be referred to as spatially multiplexed electrodes. The electrodes may be traditional square pixels such as those used in a conventional transmissive or reflective display. However, as there will be considerably more electrodes than for a conventional display, it is possible that such pixels will introduce a significant amount of noise (i.e., higher order) and the low fill factor will reduce overall efficiency.

Figure 4:
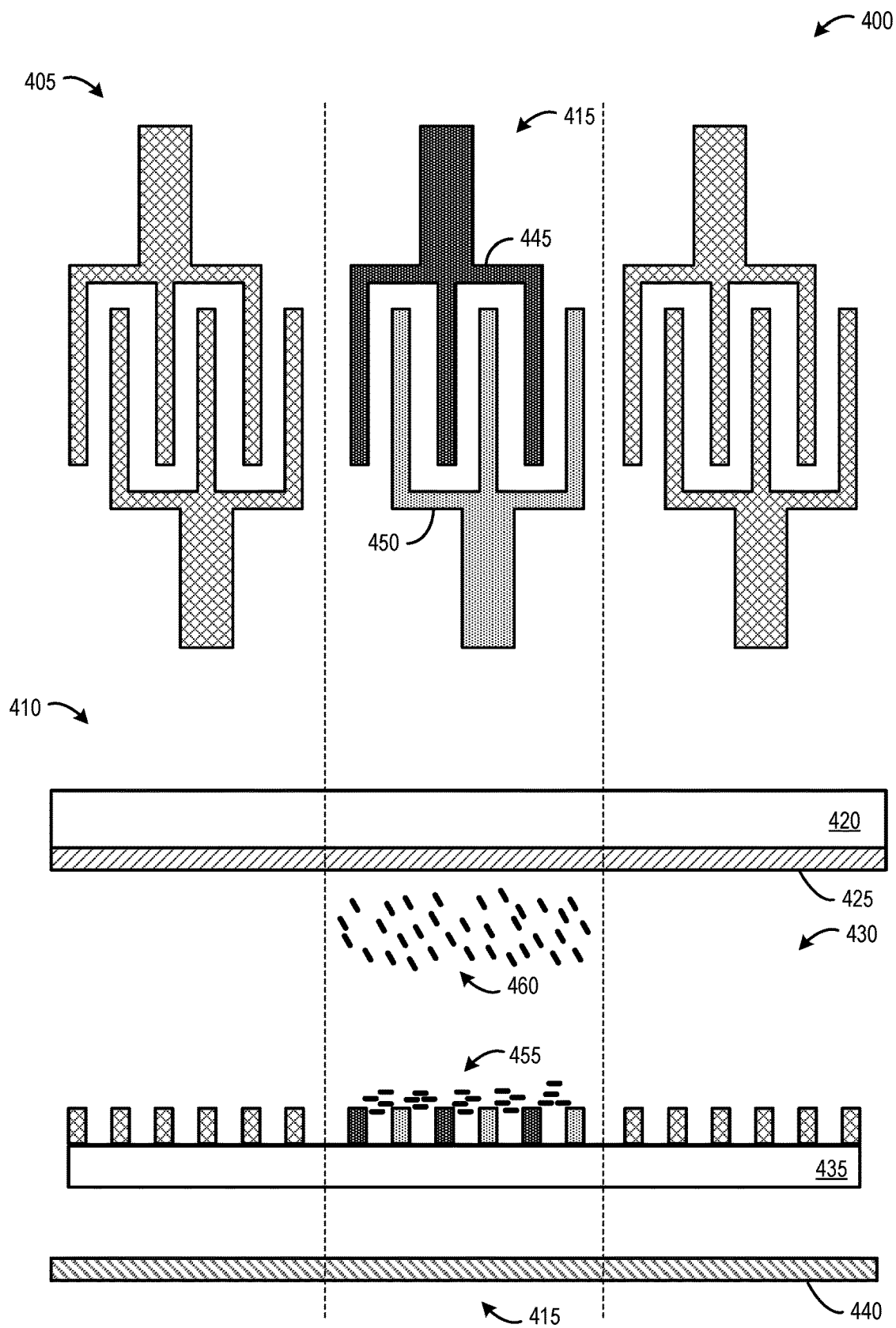
FIG. 4 shows an example pixel array including pixels having interdigitated electrodes.

FIG. 4 schematically depicts an example pixel array 400. At 405, pixel array 400 is shown from a top-down view. At 410, a cross-sectional profile of pixel array 400 is shown.

Pixel array 400 includes a plurality of pixels, of which three are depicted. Pixel array 400 will be described primarily with regard to pixel 415.

Each pixel of pixel array 400 includes a light input side 420, a common ground reference electrode 425, a liquid crystal (LC) layer 430, a light output side 435, and a polarizer 440. Pixel 415 includes a first drive electrode 445 and a second drive electrode 450. In this example, first drive electrode 445 and second drive electrode 450 are configured as interdigitated electrodes. First drive electrode 445 and second drive electrode 450 may be configured to independently apply voltages to pixel 415 (e.g., V1 and V2). Although depicted as having parallel conductors, first drive electrode 445 and second drive electrode 450 may alternatively include zig-zag conductors, cross-embedded conductors, or other suitable conductor configurations. In this configuration, all conductors within first drive electrode 445 and second drive electrode 450 are driven by a common source, and thus exhibit the same voltage.

As shown at 455, first drive electrode 445 and second drive electrode 450 can introduce in-plane switching, orienting LC molecules located in or near the fringe fields between the electrodes such that polarization modulation is introduced to light wavefronts traversing pixel 415. The polarization modulation is based on a first function of the voltages applied by first drive electrode 445 and second drive electrode 450. As shown at 460, phase modulation is introduced to the light wavefront by LC molecules proximal to light input side 420. The phase modulation is based on a second function of the voltages applied by first drive electrode 445 and second drive electrode 450.

Figure 5:
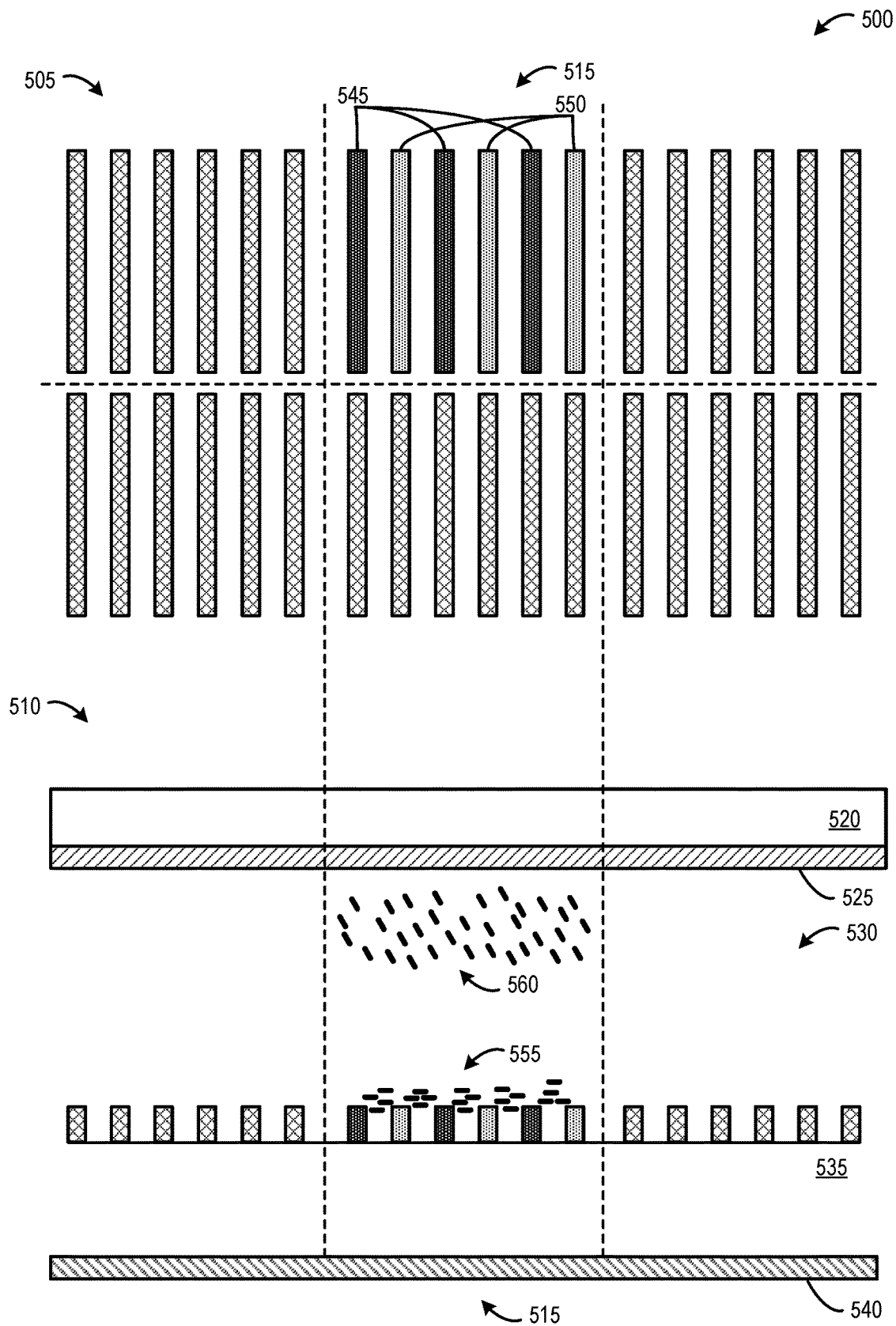
FIG. 5 shows an example pixel array including pixels having parallel electrodes.

FIG. 5 schematically depicts another example pixel array 500. At 505, pixel array 500 is shown from a top-down view. At 510, a cross-sectional profile of pixel array 500 is shown. Pixel array 500 includes a plurality of pixels, of which six are depicted. Pixel array 500 will be described primarily with regard to pixel 515. Each pixel of pixel array 500 includes a light input side 520, a common ground reference electrode 525, a liquid crystal (LC) layer 530, a light output side 535, and a polarizer 540.

Pixel 515 includes a first set of drive electrodes 545 and a second set of drive electrode 550. As shown at 555, first drive electrode 445 and second drive electrode 450 can introduce polarization modulation by affecting the orientation of LC molecules located in or near the fringe fields between the electrodes, and may introduce phase modulation by affecting the orientation of LC molecules located proximal to light input side 520.

In this example, first set of drive electrodes 545 and second set of drive electrode 550 are configured as alternating parallel sets of electrodes. Each set of electrodes may be addressed as a group using an electric backplane. However, in some examples, each electrode may be addressed individually, for example, using a digitally controlled voltage supply.

Figure 6:
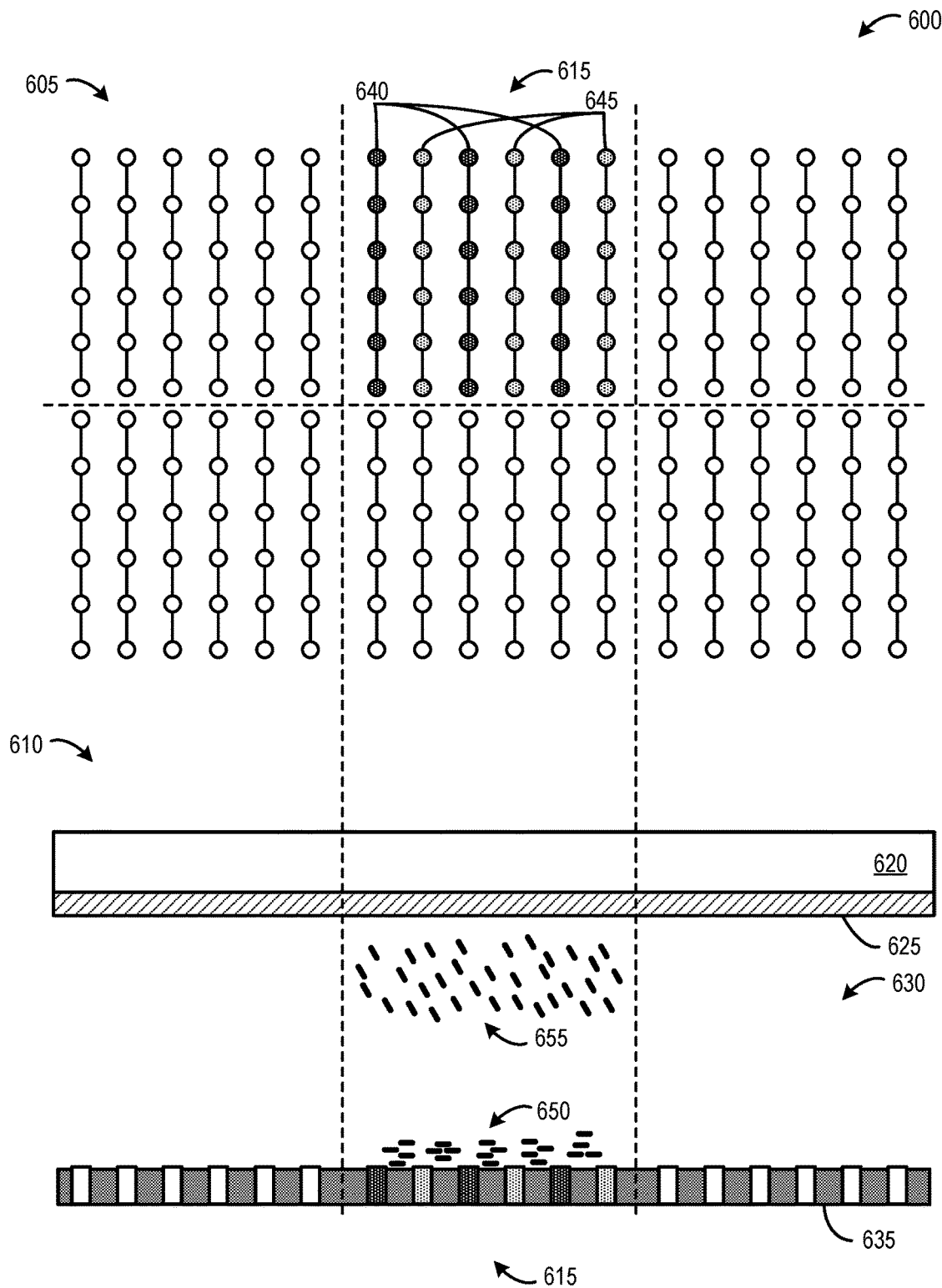
FIG. 6 shows an example pixel array including pixels having point conductors.

FIG. 6 schematically depicts an additional example pixel array 600. At 605, pixel array 600 is shown from a top-down view. At 610, a cross-sectional profile of pixel array 600 is shown. Pixel array 600 includes a plurality of pixels, of which six are depicted. Pixel array 600 will be described primarily with regard to pixel 615. Each pixel of pixel array 600 includes a light input side 620, a common ground reference electrode 625, a liquid crystal (LC) layer 630, and a dielectric mirror 635. Pixel 615 further includes a first set of drive electrodes 640 and a second set of drive electrodes 645.

Dielectric mirror 635 may be a high-reflectivity surface, configuring pixel array 600 as a reflective array. As such, first set of drive electrodes 640 and second set of drive electrodes 645 may be positioned close to the top of the surface of dielectric mirror 635 to prevent a reduction in the strength of fringing fields generated between the electrodes. In this example, first set of drive electrodes 640 and second set of drive electrodes 645 are located in the bulk of dielectric mirror 635, with the electrodes extending into LC layer 630. In other examples, the electrodes may be located on the surface of dielectric mirror 635. In configurations where dielectric mirror 635 is very thin and size of pixel 615 is relatively large, the electrodes may be deposed at the bottom of the dielectric mirror.

In the configuration shown in FIG. 6, first set of drive electrodes 640 and second set of drive electrodes 645 comprise point conductors. Such electrodes may extend through dielectric mirror 635 by using electrodes that resemble tall, thin walls (1D electrodes). Alternatively, the electrodes may be vertical electrical connections (0D electrodes), similar to through-silicon vias. Groups of these electrodes can be connected together in a backplane to form the desired fringing fields.

As shown at 650, first drive electrode 640 and second drive electrode 645 can introduce polarization modulation by affecting the orientation of LC molecules located in or near the fringe fields between the electrodes, and may introduce phase modulation by affecting the orientation of LC molecules located proximal to light input side 620.

Each set of electrodes may be addressed as a group using an electric backplane. Although shown connected linearly, in some examples, the electrodes may be connected diagonally, in a checkerboard pattern, or other suitable pattern. However, in some examples, each electrode may be addressed individually, for example, using a digitally controlled voltage supply. In some examples, a backplane may comprise large arrays of 0D or 1D conductors where each electrode is individually addressed. As such, the electrodes may act as sub-pixels. All electrodes in a pixel group or subgroup may be driven to the same voltage, or a gradient/stepwise pattern may be implemented.

Figure 7:
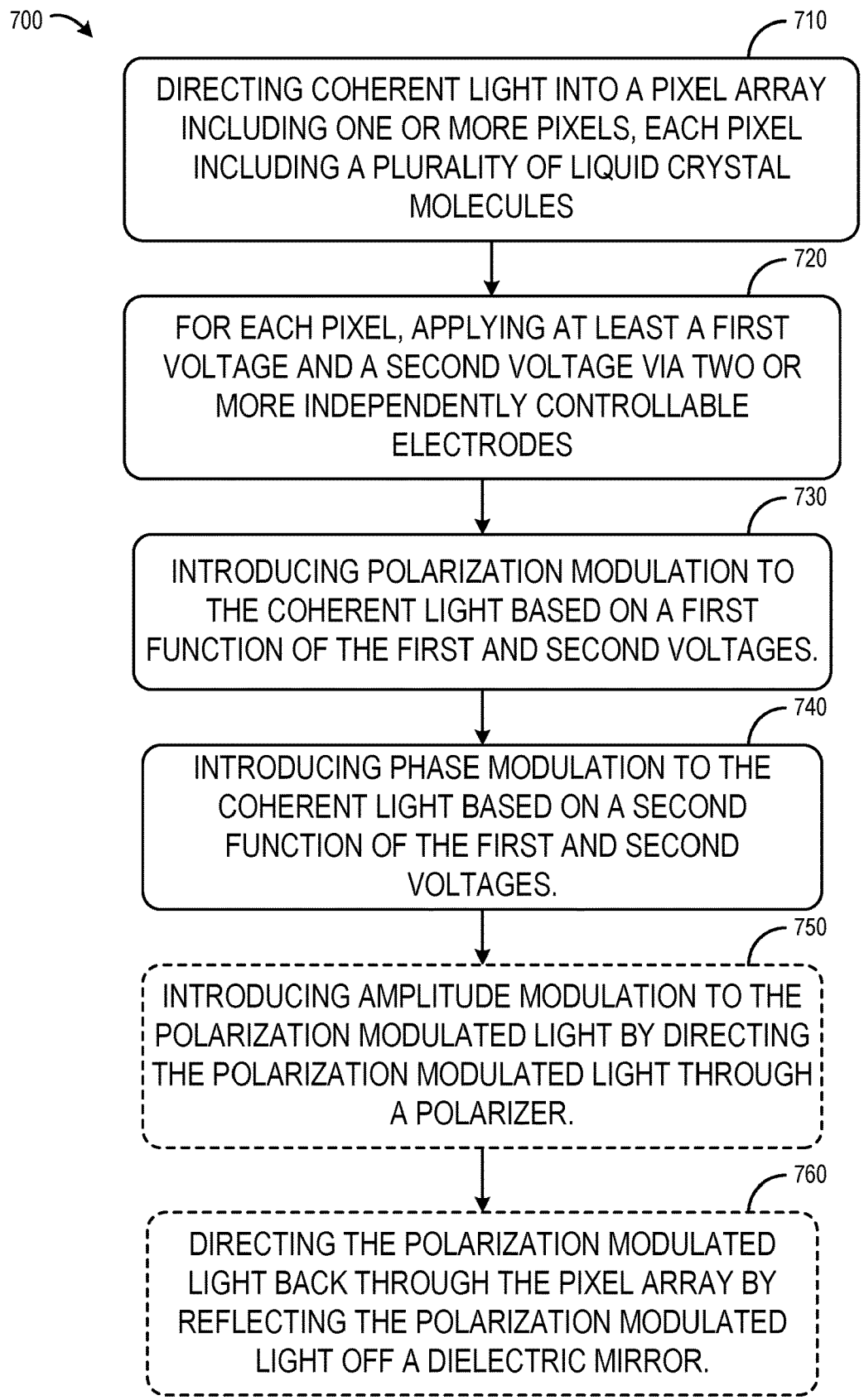
FIG. 7 depicts a flow-chart for an example method for introducing phase modulation and polarization modulation via two or more independently controllable electrodes.

FIG. 7 depicts a flow-chart for an example method 700 for introducing phase modulation and polarization modulation via two or more independently controllable electrodes. At 710, method 700 includes directing coherent light into a pixel array including one or more pixels, each pixel including a plurality of liquid crystal molecules. At 720, method 700 includes for each pixel, applying at least a first voltage and a second voltage via two or more independently controllable electrodes relative to a ground electrode. The independently controllable electrodes may take any suitable form. For example, the electrodes may be interdigitated, arranged in parallel, or be arranged as an array of point electrodes.

At 730, method 700 includes introducing polarization modulation to the coherent light based on a first function of the first and second voltages, and at 740, method 700 includes introducing phase modulation to the coherent light based on a second function of the first and second voltages. At 750, method 700 optionally includes introducing amplitude modulation to the polarization modulated light by directing the polarization modulated light through a polarizer. Further, at 760, method 700 optionally includes directing the polarization modulated light back through the pixel array by reflecting the polarization modulated light off a dielectric mirror.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
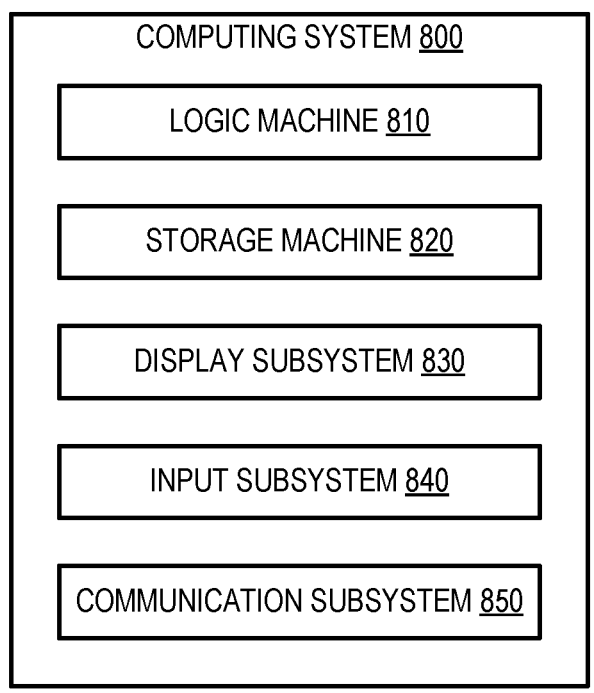
FIG. 8 shows an example computing system.

FIG. 8 schematically shows a non-limiting embodiment of a computing system 800 that can enact one or more of the methods and processes described above. Computing system 800 is shown in simplified form. Computing system 800 may take the form of one or more holographic projection devices, near-eye display devices, head-mounted computing devices, personal computers, server computers, tablet computers, home-entertainment computers, network computing devices, gaming devices, mobile computing devices, mobile communication devices (e.g., smart phone), and/or other computing devices.

Computing system 800 includes a logic machine 810 and a storage machine 820. Computing system 800 may optionally include a display subsystem 830, input subsystem 840, communication subsystem 850, and/or other components not shown in FIG. 8.

Logic machine 810 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 820 includes one or more physical devices configured to hold instructions executable by the logic machine to implement the methods and processes described herein. When such methods and processes are implemented, the state of storage machine 820 may be transformed—e.g., to hold different data.

Storage machine 820 may include removable and/or built-in devices. Storage machine 820 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 820 may include volatile, nonvolatile, dynamic, static, read/write, read-only, random-access, sequential-access, location-addressable, file-addressable, and/or content-addressable devices.

It will be appreciated that storage machine 820 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 810 and storage machine 820 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 810 executing instructions held by storage machine 810. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 830 may be used to present a visual representation of data held by storage machine 820. This visual representation may take the form of a graphical user interface (GUI). As the herein described methods and processes change the data held by the storage machine, and thus transform the state of the storage machine, the state of display subsystem 830 may likewise be transformed to visually represent changes in the underlying data. Display subsystem 830 may include one or more display devices utilizing virtually any type of technology. Such display devices may be combined with logic machine 810 and/or storage machine 820 in a shared enclosure, or such display devices may be peripheral display devices.

When included, input subsystem 840 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 850 may be configured to communicatively couple computing system 800 with one or more other computing devices. Communication subsystem 850 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

In another example, an optical projection device, comprises a pixel array including one or more pixels; two or more independently controllable electrodes for each pixel; and a common ground reference electrode for the pixel array. In such an example, or any other example, the optical projection device may additionally or alternatively comprise a light source configured to output coherent light to illuminate the one or more pixels of the pixel array. In any of the preceding examples, or any other example, the common ground reference may additionally or alternatively be located on a light input side of the pixel array, and the independently controllable electrodes may additionally or alternatively be located on an opposite side of the pixel array. In any of the preceding examples, or any other example, the independently controllable electrodes may additionally or alternatively be located on a light output side of the pixel array. In any of the preceding examples, or any other example, the optical projection device may additionally or alternatively comprise a polarizer situated downstream of the light output side of the pixel array. In any of the preceding examples, or any other example, the optical projection device may additionally or alternatively comprise a dielectric mirror situated on the opposite side of the pixel array. In any of the preceding examples, or any other example, each pixel may additionally or alternatively include a plurality of liquid crystal molecules, at least some of the liquid crystal molecules within a pixel may additionally or alternatively be oriented in a first direction based on a first function of voltages applied by the two or more independently controllable electrodes for the pixel; and at least some of the liquid crystal molecules within the pixel may additionally or alternatively be oriented in a second direction based on a second function of the voltages applied by the two or more independently controllable electrodes for the pixel. In any of the preceding examples, or any other example, at least some of the liquid crystal molecules within the pixel may additionally or alternatively be oriented in a second direction further based on a voltage of the common ground reference electrode. In any of the preceding examples, or any other example, the two or more independently controllable electrodes may additionally or alternatively include two or more interdigitated electrodes. In any of the preceding examples, or any other example, the two or more independently controllable electrodes may additionally or alternatively include two or more groups of parallel conductors. In any of the preceding examples, or any other example, the two or more independently controllable electrodes may additionally or alternatively include two or more groups of point conductors. In any of the preceding examples, or any other example, the two or more independently controllable electrodes may additionally or alternatively be addressed by an electric backplane. In any of the preceding examples, or any other example, the two or more independently controllable electrodes may additionally or alternatively be addressed by a digitally controlled voltage supply.

In another example, a method for operating an optical projection device, comprises directing coherent light into a pixel array including one or more pixels, each pixel including a plurality of liquid crystal molecules; and for each pixel, applying at least a first voltage and a second voltage via two or more independently controllable electrodes. In such an example, or any other example, the method may additionally or alternatively comprise introducing polarization modulation to the coherent light based on a first function of the first and second voltages. In any of the preceding examples, or any other example, the method may additionally or alternatively comprise introducing phase modulation to the coherent light based on a second function of the first and second voltages. In any of the preceding examples, or any other example, the method may additionally or alternatively comprise introducing amplitude modulation to the polarization modulated light by directing the polarization modulated light through a polarizer. In any of the preceding examples, or any other example, the method may additionally or alternatively comprise directing the polarization modulated light back through the pixel array by reflecting the polarization modulated light off a dielectric mirror.

In yet another example, a head mounted display device, comprises a pixel array including one or more pixels, each pixel including a plurality of liquid crystal molecules; a light source configured to output coherent light to illuminate the one or more pixels of the pixel array; two or more independently controllable electrodes for each pixel; a common ground reference electrode for the pixel array; and a drive array configured to, for each pixel, drive at least one independently controllable electrode at a first voltage, and at least one independently controllable electrode at a second voltage. In such an example, the common ground reference electrode and the two or more independently controllable electrodes for each pixel may additionally or alternatively be arranged such that polarization modulation is introduced to the coherent light based on a first function of the first and second voltages, and such that phase modulation is introduced to the coherent light based on a second function of the first and second voltages.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A device, comprising:
   a pixel array including two or more pixels, each pixel including a plurality of liquid crystal molecules;
   a light source configured to output coherent light to illuminate the two or more pixels of the pixel array;
   two or more independently controllable drive electrodes for each pixel, each drive electrode configured to receive a holographic drive signal based on a Fourier transform of the coherent light, the holographic drive signals for each pixel including at least a phase component defining phase modulation for the pixel and a polarization component defining polarization modulation for the pixel; and
   a common ground reference electrode for the pixel array, and wherein
   at least some of the liquid crystal molecules within a pixel are oriented in a first direction based on a first function of the first and second voltages applied by the two or more independently controllable drive electrodes for the pixel; and at least some of the liquid crystal molecules within the pixel are oriented in a second direction based on a second function of the first and second voltages applied by the two or more independently controllable drive electrodes for the pixel.

2. The device of claim 1, wherein the common ground reference is located on a light input side of the pixel array, and wherein the independently controllable drive electrodes are located on an opposite side of the pixel array.

3. The device of claim 2, wherein the independently controllable drive electrodes are located on a light output side of the pixel array.

4. The device of claim 3, further comprising:
a polarizer situated downstream of the light output side of the pixel array.

5. The device of claim 2, further comprising a dielectric mirror situated on the opposite side of the pixel array.

6. The device of claim 1, wherein at least some of the liquid crystal molecules within the pixel are oriented in the second direction further based on a voltage of the common ground reference electrode.

7. The device of claim 1, wherein the two or more independently controllable drive electrodes include two or more interdigitated electrodes.

8. The device of claim 1, wherein the two or more independently controllable drive electrodes include two or more groups of parallel conductors.

9. The device of claim 1, wherein the two or more independently controllable drive electrodes include two or more groups of point conductors.

10. The device of claim 1, wherein the two or more independently controllable drive electrodes are addressed by an electric backplane.

11. The device of claim 1, wherein the two or more independently controllable drive electrodes are addressed by a digitally controlled voltage supply.

12. A method for operating an optical device, comprising:
directing coherent light into a pixel array including one or more pixels, each pixel including a plurality of liquid crystal molecules; and
for each pixel, applying at least a first voltage and a second voltage via two or more independently controllable drive electrodes, each drive electrode configured to receive a holographic drive signal based on a Fourier transform of the coherent light, the holographic drive signals for each pixel including at least a phase component defining phase modulation for the pixel and a polarization component defining polarization modulation for the pixel, such that
at least some of the liquid crystal molecules within a pixel are oriented in a first direction based on a first function of the first and second voltages applied by the two or more independently controllable drive electrodes for the pixel; and
at least some of the liquid crystal molecules within the pixel are oriented in a second direction based on a second function of the first and second voltages applied by the two or more independently controllable drive electrodes for the pixel.

13. The method of claim 12, further comprising:
introducing polarization modulation to the coherent light based on the first function of the first and second voltages.

14. The method of claim 12, further comprising:
introducing phase modulation to the coherent light based on the second function of the first and second voltages.

15. The method of claim 14, further comprising:
introducing amplitude modulation to the polarization modulated light by directing the polarization modulated light through a polarizer.

16. The method of claim 14, further comprising:
directing the polarization modulated light back through the pixel array by reflecting the polarization modulated light off a dielectric mirror.

17. A head mounted display device, comprising:
a pixel array including one or more pixels, each pixel including a plurality of liquid crystal molecules;
a light source configured to output coherent light to illuminate the one or more pixels of the pixel array;
two or more independently controllable drive electrodes for each pixel, each drive electrode configured to receive a holographic drive signal based on a Fourier transform of the coherent light, the holographic drive signals for each pixel including at least a phase component defining phase modulation for the pixel and a polarization component defining polarization modulation for the pixel;
a common ground reference electrode for the pixel array; and
a drive array configured to, for each pixel, drive at least one independently controllable drive electrode at a first voltage, and at least one other independently controllable drive electrode at a second voltage, such that
at least some of the liquid crystal molecules within a pixel are oriented in a first direction based on a first function of the first and second voltages applied by the two or more independently controllable drive electrodes for the pixel; and
at least some of the liquid crystal molecules within the pixel are oriented in a second direction based on a second function of the first and second voltages applied by the two or more independently controllable drive electrodes for the pixel.

18. The head mounted display device of claim 17, where the common ground reference electrode and the two or more independently controllable drive electrodes for each pixel are arranged such that polarization modulation is introduced to the coherent light based on the first function of the first and second voltages, and such that phase modulation is introduced to the coherent light based on the second function of the first and second voltages.

19. The device of claim 1, wherein the phase component of the holographic drive signal is represented as an argument of a complex function having values that are complex numbers including real and imaginary parts, and wherein the polarization component is represented as a modulus of the complex function.

20. The device of claim 4, wherein the phase component of the holographic drive signal is configured to generate phase modulation of the coherent light within a phase range of $0$ to $2\pi$, and wherein the polarization component of the holographic drive signal is configured to generate amplitude modulation within an amplitude range of 50% to 100%.

* * * * *